(12) United States Patent
Heimbuch

(10) Patent No.: US 9,252,873 B2
(45) Date of Patent: Feb. 2, 2016

(54) METHODS, APPARATUSES, AND SYSTEMS FOR MONITORING SIGNAL STRENGTH IN AN OPTICAL NETWORK

(75) Inventor: Mark Heimbuch, Chatsworth, CA (US)

(73) Assignee: Source Photonics, Inc., West Hills, CA (US)

( * ) Notice: Subject to any disclaimer, the term of this patent is extended or adjusted under 35 U.S.C. 154(b) by 403 days.

(21) Appl. No.: 13/316,238

(22) Filed: Dec. 9, 2011

(65) Prior Publication Data
US 2013/0148962 A1 Jun. 13, 2013

(51) Int. Cl.
| | |
|---|---|
| *H04B 10/08* | (2006.01) |
| *H04B 17/00* | (2015.01) |
| *H04B 10/06* | (2006.01) |
| *H04B 10/00* | (2013.01) |
| *H04B 10/079* | (2013.01) |
| *H04B 10/2507* | (2013.01) |

(52) U.S. Cl.
CPC ........ *H04B 10/0799* (2013.01); *H04B 10/2507* (2013.01)

(58) Field of Classification Search
CPC ........ H04B 10/00; H04B 10/08; H04B 10/06; H04B 10/0799; H04B 10/2507
USPC .................................................. 398/38, 202
See application file for complete search history.

(56) References Cited

U.S. PATENT DOCUMENTS

| | | | | |
|---|---|---|---|---|
| 7,200,336 B2* | 4/2007 | Yu | ........................ | G02B 6/4277 398/135 |
| 7,209,178 B1* | 4/2007 | Lee | ..................... | H04N 21/4122 348/513 |
| 7,235,852 B2* | 6/2007 | Wang | .................. | H01L 31/0232 257/432 |
| 7,650,077 B2* | 1/2010 | Yu | .......................... | H04B 10/40 398/136 |
| 8,442,398 B2* | 5/2013 | Li | ...................... | H04B 10/0795 398/16 |
| 8,787,838 B2* | 7/2014 | Kauppert | .............. | H04B 17/318 365/185.22 |
| 9,048,947 B2* | 6/2015 | Chou | ................ | H04B 10/07955 |
| 2002/0131135 A1* | 9/2002 | Chow | .................... | G02B 6/4202 398/202 |
| 2004/0222360 A1* | 11/2004 | Douma | .............. | H04B 10/0799 250/214 R |
| 2005/0045981 A1* | 3/2005 | Wang | ................... | H01L 31/0232 257/432 |
| 2005/0169645 A1* | 8/2005 | Diaz | ....................... | H04B 10/69 398/202 |
| 2006/0029390 A1* | 2/2006 | Schmuck | .............. | H04B 10/071 398/33 |
| 2006/0093362 A1* | 5/2006 | Welch | ................. | G02B 6/12004 398/87 |
| 2006/0263100 A1* | 11/2006 | Uesaka | ................... | H04B 10/66 398/202 |
| 2007/0053650 A1* | 3/2007 | Shimada | .............. | H04J 14/0221 385/140 |
| 2007/0201867 A1* | 8/2007 | DeLew | ............ | H04B 10/07955 398/38 |
| 2010/0098413 A1* | 4/2010 | Li | ....................... | H04B 10/0795 398/38 |
| 2010/0142972 A1* | 6/2010 | Chou | ................... | H04B 10/564 398/158 |
| 2010/0303471 A1* | 12/2010 | Khalouf | ............... | H04B 10/508 398/186 |
| 2011/0116792 A1* | 5/2011 | Blumenthal | ......... | H04B 10/801 398/43 |

(Continued)

*Primary Examiner* — Ken Vanderpuye
*Assistant Examiner* — Abbas H Alagheband
(74) *Attorney, Agent, or Firm* — Andrew D. Fortney; Central California IP Group, P.C.

(57) ABSTRACT

An optical transceiver, optical network and methods for using the same are disclosed. The optical transceiver and/or optical network and related methods may be useful for independently monitoring the optical transceiver and/or optical network. The optical transceiver generally includes an optical receiver configured to receive optical information; circuitry configured to calculate signal strength values of the received optical information from a plurality of remote optical transmitters; logic configured to process the signal strength values for each of the plurality of remote optical transmitters; and one or more memories configured to store the signal strength values. Optionally, the optical transceiver may notify a system or host when the transceiver, network or component thereof is operating outside a predetermined threshold.

16 Claims, 6 Drawing Sheets

(56) References Cited

U.S. PATENT DOCUMENTS

2011/0158656 A1* 6/2011 Vieira ................ H04B 10/6911
398/202

2011/0254608 A1* 10/2011 Kai .................... H04B 10/2942
327/306

2011/0306307 A1* 12/2011 Kauppert ............. H04B 17/318
455/67.13

* cited by examiner (Background)

(Background)

METHODS, APPARATUSES, AND SYSTEMS FOR MONITORING SIGNAL STRENGTH IN AN OPTICAL NETWORK

FIELD OF THE INVENTION

The present invention generally relates to the field of optical data communications and network technology. More specifically, embodiments of the present invention pertain to an optical transceiver and/or optical network, and method(s) of making and/or using the same. In one embodiment, the optical transceiver calculates signal strength values from received optical information from a plurality of remote optical transmitters and processes the signal strength values to evaluate whether the optical transceiver is operating within one or more predetermined operating limits.

DISCUSSION OF THE BACKGROUND

A passive optical network (PON) provides for the optical transmission of data between a central office and one or more users. Typically, the central office comprises an optical line terminal (OLT) or optical transceiver that transmits and receives optical data via fiber optic media between the OLT and a user node, which utilizes a transceiver often referred to as either an optical network unit (ONU) or optical network terminal (ONT).

FIG. 1 includes an optical network 100 comprising one OLT 105 optically transmitting data to and receiving data from a single ONU 110. In the one-to-one configuration, shown in FIG. 1, the transceivers 105 and 110 alternate transmitting data along a single communication channel 115.

FIG. 2 shows a flow chart 200 illustrating a method of evaluating communications received from an ONU. The evaluation begins at 205. At 210, a received signal strength indication (RSSI) is determined for a signal received from the ONT in an OLT receiving the signal. At 215, the OLT stores a single RSSI value for the signal received from the ONU in memory. At 220, the OLT receives a request from the OLT system (i.e., hardware representing one or more layers of the network higher than the OLT) to send the RSSI to the OLT system. At 225, the OLT sends the RSSI to the OLT system. At 230, if the OLT system requests another RSSI, the flow returns to 210. If the flow returns to 210, the flow continues, and at 215, the memory is flushed and the newly obtained RSSI replaces the previous RSSI in the memory. When the OLT system does not request another RSSI, the method ends at 235. Based on the RSSI values, the OLT system can then decide whether the network or a particular ONU is operating properly or is in need of adjustment or repair.

Such an approach is not ideal for a one-to-many network. Under the approach of FIGS. 1-2, the OLT system evaluates a particular ONU at a particular point in time, rather than the OLT itself evaluating RSSI values. Further, an optical transceiver in the OLT under this approach has no independent capability to determine and evaluate RSSI data, or notify the system when network components (including the OLT) are operating outside of predetermined parameter thresholds.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is directed to an optical transceiver comprising an optical receiver configured to receive optical information, circuitry configured to calculate signal strength values of the received optical information from a plurality of remote optical transmitters, logic configured to process the signal strength values for each of the plurality of remote optical transmitters, and memory configured to store the signal strength values. In various embodiments, the logic is further configured to evaluate at least a subset of the signal strength values to determine whether the optical transceiver is operating outside a predetermined parameter threshold. In a further embodiment, the optical transceiver is configured to notify a system or a host when the optical transceiver is operating outside a predetermined parameter threshold. In further embodiments, the optical transceiver comprises an interface configured to transmit at least some of the calculated or processed signal strength values to a system or host.

Additionally, embodiments of the present invention relate to an optical network and/or methods for monitoring an optical transceiver and/or optical network. The method for monitoring the optical transceiver generally comprises receiving one or more optical signals from a plurality of external transmitters, calculating a signal strength value for one or more optical signals, storing the signal strength values, and accessing and/or evaluating at least a subset of the signal strength values. In various embodiments, the optical transceiver establishes the timing sequence for receiving one or more optical signals from each of the external transmitters. In further embodiments, the optical transceiver obtains a random selection of signal strength values to provide a randomized and/or equally-weighted distribution of signal strength values for the plurality of remote optical transmitters. In some embodiments, the method further comprises determining when the optical transceiver is operating outside a predetermined parameter limit or threshold based on the accessed and/or evaluated signal strength values. In further embodiments, the method further comprises notifying a host or a system when the optical transceiver is operating outside of the predetermined parameter limit or threshold.

Another embodiment of the invention relates to an optical network generally comprising the optical transceiver described above, a plurality of network transceivers in optical communication with the optical transceiver, and a host coupled to the optical transceiver or a system including the optical transceiver. In further embodiments, the optical network determines when the optical transceiver collects and/or determines RSSI values for optical transmissions received from the network transceivers. This can be done either independently or at the request of the host or OLT system.

The method for monitoring an optical network setting comprises transmitting an optical signal from each of a plurality of terminals in the optical network, receiving the optical signals from each of the plurality of terminals in a receiver, calculating a signal strength value for optical signals received by the receiver, and processing at least some of the signal strength values. In some embodiments, the optical transceiver collects RSSI data based on the network configuration (e.g., signal timing information provided by the host or OLT system). In some embodiments, the method for monitoring the optical network comprises determining if the optical network is operating outside a predetermined parameter threshold or limit, such as dynamic range. In some embodiments, the method further comprises transmitting at least some of the calculated and/or processed signal strength values to a host coupled to the receiver or a system including the optical receiver. In further embodiments, the method further comprises notifying the host or the system when the optical network is operating outside the predetermined parameter threshold or limit. In further embodiments, the method further comprises displaying the calculated signal strength values as a histogram on a display interface.

Various embodiments and/or examples disclosed herein may be combined with other embodiments and/or examples, as long as such a combination is not explicitly disclosed herein as being unfavorable, undesirable or disadvantageous.

The present disclosure overcomes disadvantages of the existing technology such as the inability of an OLT to ensure adequate performance and proper operation. Advantages of the present invention include an optical transceiver capable of independently evaluating whether the optical transceiver is operating within specifications, evaluating whether components of an optical network are operating within specifications, and/or notifying a host or system whether components are operating outside of certain operating limits.

These and other advantages of the present invention will become readily apparent from the detailed description of various embodiments below.

DETAILED DESCRIPTION

Figure 1:
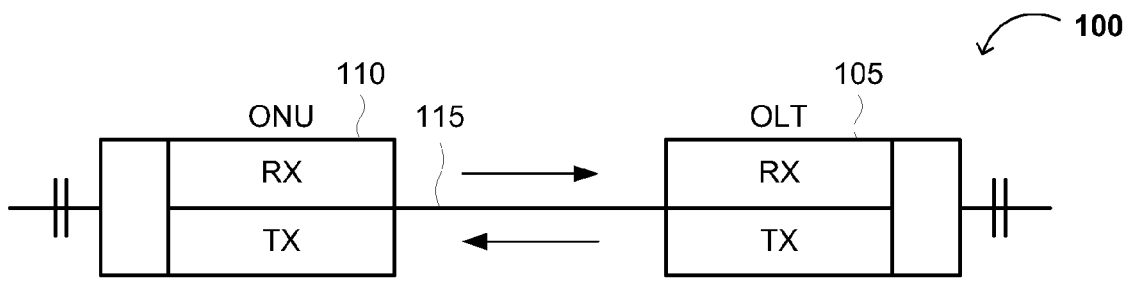
FIG. 1 is a diagram showing a background point-to-point optical network including an optical line terminal (OLT) and an optical network transceiver (ONU), communicating via point-to-point transmissions.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Furthermore, all characteristics, measures or processes disclosed in this document, except characteristics and/or processes that are mutually exclusive, can be combined in any manner and in any combination possible. Any characteristic disclosed in the present specification, Claims, Abstract and Figures can be replaced by other equivalent characteristics or characteristics with similar objectives, purposes and/or functions, unless specified otherwise. Each characteristic is generally only an embodiment of the invention disclosed herein.

Some portions of the detailed descriptions which follow are presented in terms of processes, procedures, logic blocks, functional blocks, processing, and other symbolic representations of operations on code, data bits, or data streams within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming" or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

For the sake of convenience and simplicity, the terms "optical signal" and "light" are generally used interchangeably herein, and use of either of these terms also includes the other, unless the context clearly indicates otherwise. Similarly, the following groups of terms are generally used interchangeably herein, and the use of any one of these terms also includes the others, unless the context clearly indicates otherwise:

"optical" and "optoelectronic";
"optical device," "optoelectronic device," "optical transceiver" and "optoelectronic transceiver";
"transmitter" and "transceiver"; and
"receiver" and "transceiver".

Also, for convenience and simplicity, the terms "connected to," "coupled with," "coupled to" and "in communication with" (which terms also refer to direct and/or indirect relationships between the connected, coupled and/or communicating elements unless the context of the term's use unambiguously indicates otherwise) may be used interchangeably, but these terms are also generally given their art-recognized meanings.

The present invention concerns an optical transceiver and/or optical network and/or method for evaluating an optical network and/or method for evaluating an optical transceiver. Embodiments of the present invention advantageously provide for an optical transceiver capable of determining signal strength values and/or evaluating those values and/or the values received from other components in an optical network. In further embodiments, the present optical transceiver provides for improved evaluation and/or notification when the optical network and/or one or more components thereof are operating outside of certain operating limits. Thus, the present optical network, transceiver and/or method provide for improved monitoring of an optical network and/or components of an optical network.

The invention, in its various aspects, will be explained in greater detail below with regard to exemplary embodiments.

An Exemplary Optical Network

Figure 3:
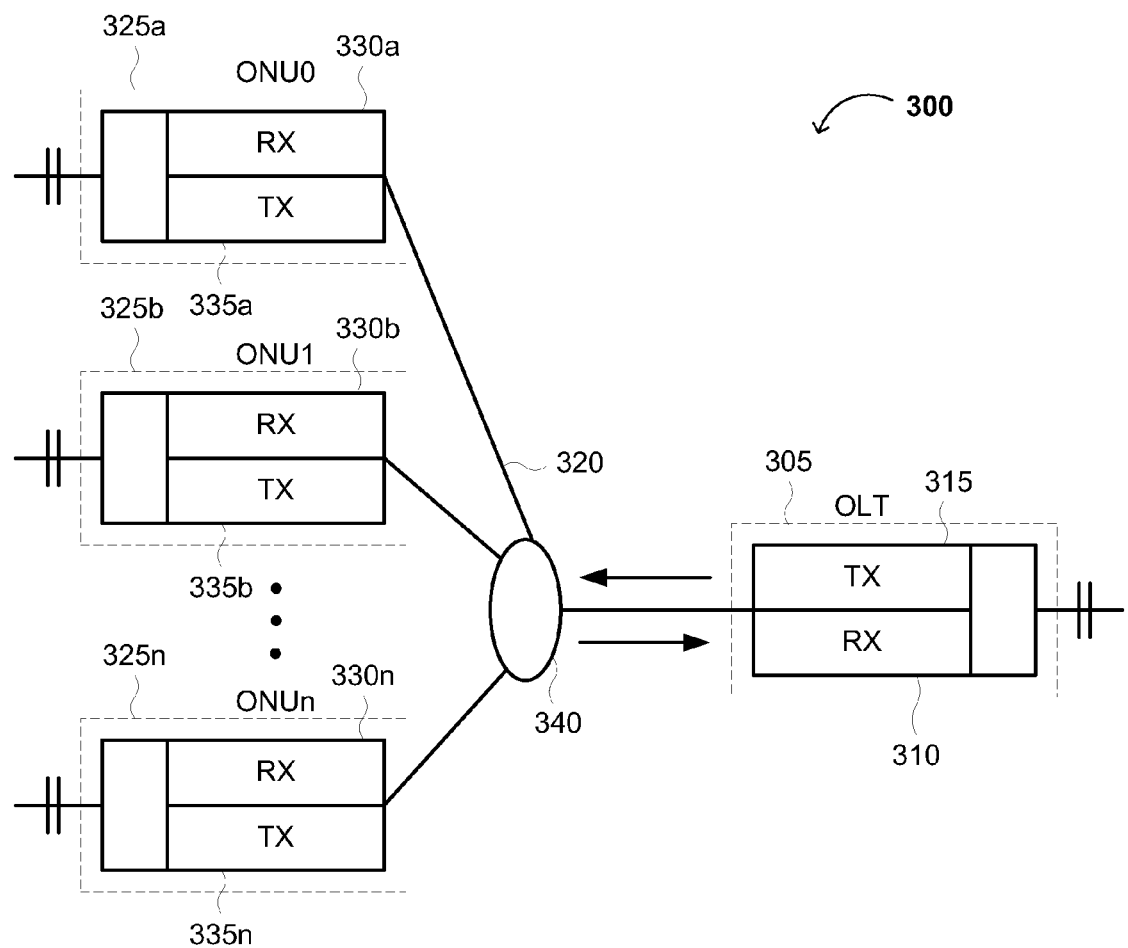
FIG. 3 is diagram of a one-to-many passive optical network (PON) network including an OLT and multiple ONU transceivers.

FIG. 3 illustrates an exemplary passive optical network (PON) 300 in accordance with embodiments of the present invention. While FIG. 3 describes a general passive optical network, embodiments of the present invention should not be limited to just the configuration of FIG. 3, and instead may be used in any number of optical network configurations, including EPONs and GPONs. Optical transceiver (e.g., OLT) 305 may be connected via optical media (e.g., hardware comprising fiber optic media 320 and/or one or more optical splitters 340 and/or other suitable optical hardware) with one or more ONUs 325a-n. While FIG. 3 references ONUs 325a-n, this number is for illustration purposes only, and one skilled in the art will readily appreciate and understand that a PON can comprise more or less than the number of ONUs 325a-n in FIG. 3. For example, PON 300 may comprise optical transceiver 305 optically connected with thirty-two (32), one hundred twenty-eight (128), or two hundred fifty-six (256) ONUs.

In PON 300, each ONU 325a-n may be located at a different distance from optical transceiver 305. Given the varying distances between the components, the transmission strength for data signals from each ONU 325a-n to optical transceiver 305 may vary. To ensure consistent and efficient data communication among the various ONUs 325a-n and the optical transceiver 305, PON 300 may utilize time-division multiplexing to facilitate the transmission of optical data between ONUs 325a-n and optical transceiver 305. Through time-division multiplexing, each ONU 325a-n transmits data to optical transceiver 305 only during an allotted or predetermined time period or time slot. The host may contain timing sequence information indicating the allotted or predetermined time period or time slot when optical transceiver 305 should receive an optical transmission from each ONU 325a-n. Based on the timing sequence, the host may then send a signal to optical transceiver 305 indicating the time period or time slot when optical transceiver 305 is to receive a communication from a particular ONU 325a-n. In an embodiment of the present invention, the host may transmit the entire timing sequence for each ONU 325a-n to optical transceiver 305 rather than sending a separate signal for each instance where optical transceiver 305 should receive a communication from a particular ONU 325a-n. In a further embodiment of the present invention, optical transceiver 305, itself, may determine the time period or time slot to receive data from each ONU 325a-n.

In an optical network, the OLT and the ONUs attempt to keep their respective transceivers transmitting optical signals at consistent power levels. However, in addition to (1) the distance between the transceivers and (2) the proper functioning of components in the transceivers and in the network, there exist other factors which may result in variations to the power level of an optical signal ultimately received by the receiver of an OLT or ONU. By way of illustration and not limitation, some reasons for link loss include variations in transmitter operation, the presence of intervening components (e.g., cables, splitters, couplers, etc.), and the use of splices. For example, link loss may result from variations in the power level of the optical signals received by optical transceiver 305 in PON 300. If optical transceiver 305 receives optical signals at improper power levels (for example, too high or too low), the data may not be properly communicated or processed. As a further example, data degradation may occur in optical transceiver 310 when a transmission from one ONU has a power within a normal operating range for the optical transceiver 310, subsequent to a transmission from another ONU that also has power within the normal operating range of the transceiver, but with a significant (and perhaps very large) difference from the subsequent ONU's power. To ensure proper and/or consistent communication, it is advantageous to ensure that the power level of the input optical signals remain within the dynamic range of the receiver of the OLT 305.

An Exemplary Optical Transceiver

An embodiment of the present invention relates to an optical transceiver comprising an optical receiver configured to receive optical information, circuitry configured to calculate signal strength values of the received optical information, logic configured to process the signal strength values, and one or more memories configured to store the signal strength values.

Figure 4:
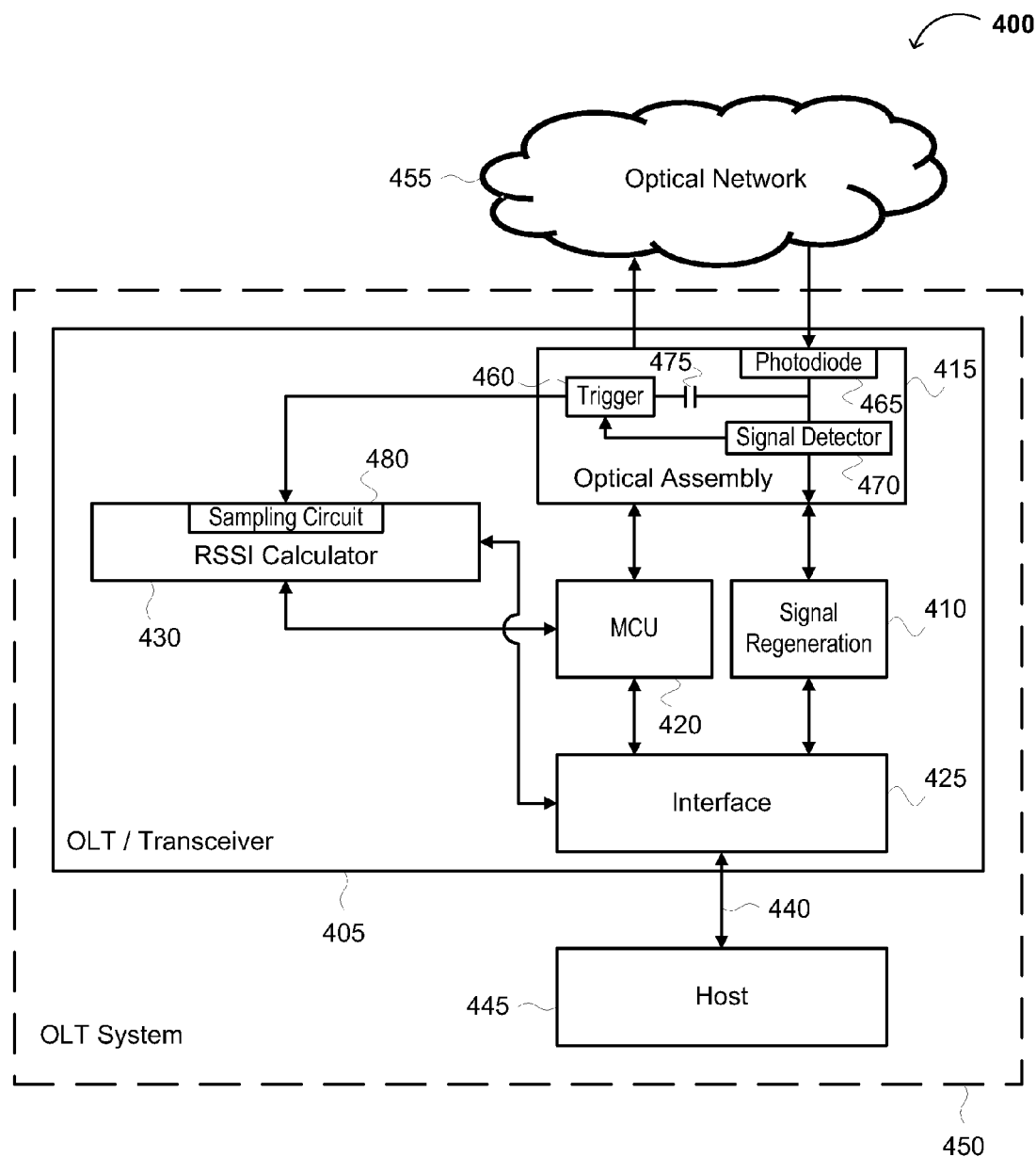
FIG. 4 is a diagram showing an exemplary OLT according to embodiments of the present invention.

FIG. 4 illustrates an exemplary optical transceiver 405 in accordance with embodiments of the present invention. Optical transceiver 405 can include signal regeneration block 410, optical assembly 415, microcontroller (MCU) 420, trigger circuit 460, RSSI calculator 430, and host interface 425. Optical transceiver 405 is communicatively connected with optical network 455, which may also comprise optical components such as ONUs 325a-n, optical fiber 320, splitters 340, multiplexers, amplifiers, repeaters, connectors and/or any other components configured to establish operations in optical network 455. In addition, optical transceiver 405 may take the form of an optical duplexer, optical triplexer, or other multiple transceiver configurations by including an appropriate number of receivers and transmitters.

Optical assembly 415 transmits and receives optical data with external components (such as one or more ONUs 325a-n) in optical network 455. Optical assembly 415 may include components and/or circuitry configured to send and receive optical signals. Optical assembly 415 may include any component configured to receive an optical signal and provide an electrical signal, such as a photodiode. Optical assembly 415 may also include any component configured to receive an electrical signal and transmit an optical signal. For example, optical assembly 415 may comprise a light-emitting diode or a laser diode, and optionally, a monitoring photodetector. In a further example, optical assembly 415 may comprise components such as one or more amplifiers in the optical data receiving pathway and one or more signal drivers and/or modulators in the optical data transmitting pathway. Optical assembly 415 may convert received optical data into an electrical signal which is subsequently transmitted to signal processor/processing block 410. For example, optical assembly 415 may include trigger 460, photodiode 465, signal detector 470, and capacitor 475. Photodiode 465 converts a received optical signal into an electrical signal, and transmits the electrical signal to signal detector 470. The electrical signal from photodiode 465 may also charge capacitor 475. When signal detector 470 detects an active or valid signal from photodiode 465, signal detector 470 can send a control signal to trigger 460. When trigger 460 receives an active control signal from signal detector 470, capacitor 475 releases its stored charge, thereby transmitting a signal corresponding to the received signal strength to sampling circuit 480 of RSSI calculator 430. Signal detector 470 also sends data and/or information from photodiode 465 to signal regeneration block 410.

Signal regeneration block 410 may comprise a first signal processor in the receiver pathway, and a second signal processor in the transmitter pathway. Optical assembly 415 may also receive an electrical signal from signal regeneration block 410 and convert it to an optical signal. Signal regeneration block 410 may include one or more amplifiers (e.g., a transimpedance amplifier, a gain amplifier, a differential amplifier, etc.) in the receiver pathway, and one or more signal drivers and/or modulators in the transmitter pathway. Optical data may thus be sent via optical signals over separate optical links, a common fiber-optic link, or any other suitable optical medium (e.g., multi-mode fiber, single-mode fiber, etc.).

Optical transceiver 405 may communicate via interface 425 with OLT system 450 and/or host 445. For example, interface 425 may be a serial or parallel interface in communication with OLT system 450 or host 445. Host 445 can be a host processor, circuit board, stand-alone optical network device (e.g., a repeater, optical switch, set-top box, etc.) or any other component or device including a controller or processor configured to communicate and/or control at least some aspects of the network. In one embodiment, optical transceiver 405 may communicate via interface 425 to send a flag or interrupt signal to OLT system 450 or host 445 whenever optical network 455, a component in network 455, or optical transceiver 405 is operating outside of one or more predetermined parameter thresholds or limits. Optical transceiver 405 may also transmit RSSI and/or other operating data to the OLT system 450 or the host 445 through the interface 425. In an even further embodiment, the calculated signal strength values may be displayed as a histogram on a display interface. In a further embodiment, OLT system 450 and/or host 445 may transmit requests for data and/or submit values for variables and/or predetermined parameter thresholds or limits to optical transceiver 405 over bus 440 and interface 425.

All or some of the RSSI values, predetermined parameter thresholds or limits may be stored in a memory in MCU 420. In one embodiment, any number of RSSI values, predetermined parameter thresholds or limits may also be stored in the memory. In a further embodiment, all or some predetermined parameter values or limits in the memory may be changed. For example, OLT system 450 or host 445 may transmit to and/or overwrite one or more predetermined parameter thresholds or limits stored in the memory. In one embodiment, the predetermined parameter thresholds or limits and/or alarms and warnings related thereto can be transmitted and/or overwritten by the vendor or end user of the optical transceiver.

Figure 5:
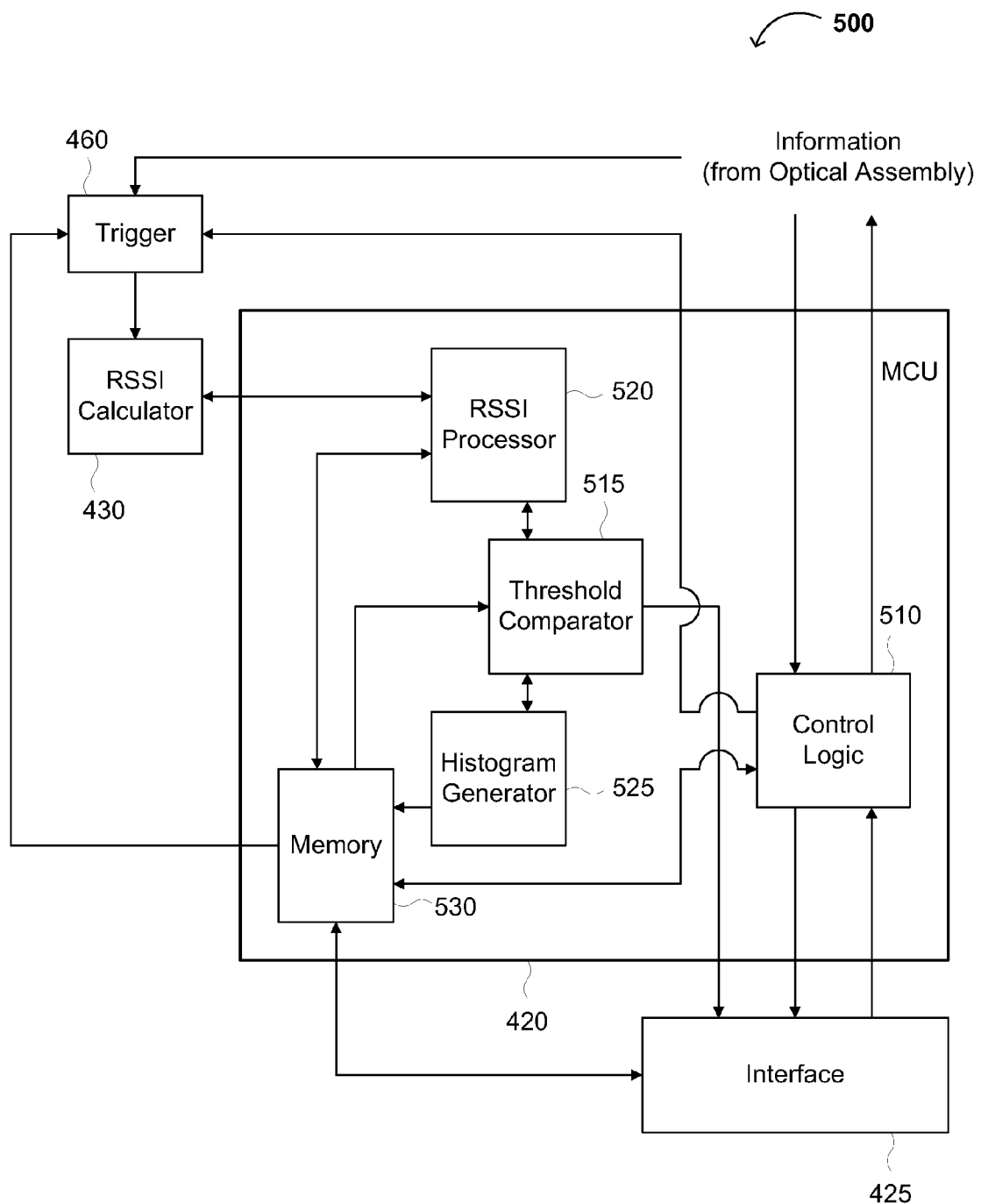
FIG. 5 is a diagram showing an exemplary microcontroller for an OLT according to embodiments of the present invention.

FIG. 5 illustrates exemplary MCU 420 for an optical transceiver in accordance with embodiments of the present invention. MCU 420 may comprise control logic 510, threshold comparator 515, RSSI processor 520, and/or histogram generator 525. Control logic 510 may also comprise a central processing unit (CPU) or microprocessor (not shown). In various embodiments, MCU 420 may communicate with optical assembly 415, interface 425 trigger circuit 460, and/or RSSI calculator 430 within optical transceiver 405. MCU 420 may be responsible for (i) controlling the flow of data and directing where to store data in memory 530, (ii) determining or calculating RSSI values, (iii) comparing RSSI values with predetermined parameter thresholds or limits, (iv) setting interrupts and/or flags, and/or (v) controlling the overall flow for processing optical data over the network (e.g., optical network 455).

In one embodiment, components and/or control logic 510 in MCU 420 determine the RSSI values. Control logic 510 receives and processes information (which may include signal strength information, such as signal amplitude) from optical assembly (not shown). Control logic 510 may then store the information in memory 530 and/or transmit an instruction to RSSI calculator 430 via trigger circuit 460 to generate an RSSI value for the signal received by the optical assembly. The RSSI value may be subsequently stored in memory 530 and/or sent to RSSI processor 520. The RSSI processor 520 and/or threshold comparator 515 may access all or a subset of RSSI values from RSSI processor 520, memory 530, and/or memory in MCU 420 to evaluate the RSSI values and determine whether optical network 455, a component in optical network 455, and/or optical transceiver 405 are operating outside predetermined parameter thresholds or limits.

In a further embodiment, MCU 420 may include both instruction and data memory (not shown). Memory 530 in MCU 420 can store data including RSSI values and/or predetermined parameter values or limits related to optical transceiver 405 and/or optical network 455 or components thereof. In certain embodiments, memory 530 comprises a volatile memory. However, memory 530 may also include non-volatile memory, or a combination of volatile and non-volatile memory. For example, predetermined parameter thresholds or limits may be stored in non-volatile memory when such parameters and/or limits do not change, or change relatively infrequently. Examples of volatile memories include static random-access memory (SRAM), dynamic RAM (DRAM), or any other suitable type of RAM or volatile storage element that maintains a stored state when power is applied. Examples of non-volatile memories include electrically erasable programmable read-only memory (EEPROM), flash EEPROM, magnetoresistive RAM (MRAM), laser programmable memories (e.g., fuse-based), or any other suitable type of ROM or non-volatile storage.

Memory 530 may include a long-term memory portion and a cache portion. The cache portion can be a smaller and faster memory (e.g., have a smaller capacity/density and be configured to operate at a higher frequency) relative to the long-term portion of memory. The long-term memory portion and/or cache portion can also include a variety of registers that can be allocated for storage of predetermined parameter thresholds or limits and RSSI values, the locations of which can be managed by MCU 420. Further, the long-term memory portion and the cache portion can be subdivided into any number of blocks, pages or other arrangements of memory. For example, the cache portion may store certain predetermined parameter values or limits and RSSIs that are more likely to be requested by MCU 420.

Further embodiments contemplate other methods for obtaining RSSI values. In one embodiment, MCU 420 obtains an RSSI value by sampling a voltage signal using an analog-to-digital converter (ADC) (not shown). For example, signal regeneration block 410 (from FIG. 4) may convert a current signal in the receiver to a voltage signal, and the ADC may sample the voltage signal. In another embodiment, MCU 420 may sample the ADC output periodically (e.g., in 500 ms increments), and using RSSI calculator 430, determine an RSSI.

In a further embodiment, the optical assembly may contain components and/or circuitry to determine the RSSI and then transmit the RSSI data to MCU 420. For example, MCU 420 may receive an RSSI generated from the signal supplied by an avalanche photodiode in the optical assembly, and the RSSI can be processed by control logic (not shown) in the optical assembly. In a further embodiment, optical transceiver 405 may contain trigger circuit 460 and/or further circuitry (for example, sample and hold circuitry) including one or more capacitors, wherein MCU 420 may determine an RSSI value based on the amount of power discharged from the capacitor(s) (after the capacitor is charged by the incoming optical signal). In one embodiment, trigger circuit 460 may be an internal gate or switch aligned to signal detector 470 or otherwise configured to receive a valid signal indicator (e.g., from the signal detector 470 in FIG. 4). In another embodiment, the host 445 or OLT system 450 may send a signal to trigger circuit 460 to obtain an RSSI value, or the optical transceiver 405 may signal trigger circuit 460 to obtain an RSSI value based on signal timing information stored in memory 530. Thus, trigger circuit 460 may be controlled internally by the optical transceiver 405 and/or externally by the host 445 or OLT system 450. MCU 420 may also retrieve RSSI data from memory 530 to evaluate whether optical transceiver 405 and/or optical network 455 are operating outside one or more predetermined parameter thresholds or limits.

In a further embodiment, the optical transceiver may provide a sampling interval for determining the RSSI values and/or the number of RSSIs to be evaluated can be static or variable. RSSIs may be calculated at a predetermined frequency and/or on-demand. For example, optical transceiver 405 may sample and/or determine an RSSI at a particular time interval (e.g., in 500 ms increments) or based on signal timing information in MCU 420. Alternatively, RSSIs may be determined at a time interval determined by, or upon a specific request from, OLT system 450 or host 445. Alternatively or additionally, optical transceiver 405 may determine an RSSI for one out of every 100, 1000 or other predetermined number of transmissions from a particular ONU 325*a-n* or combination of ONUs 325*a-n* in the optical network. The determination and storage of RSSI values may occur as part of the normal operations of optical transceiver 405, or they may occur in the background (e.g., when its normal operations are nascent or quiet). In one embodiment where optical transceiver 405 does not sequentially determine RSSI values (e.g., where it receives optical transmissions too quickly to determine an RSSI for each incoming optical transmission), optical transceiver 405 may use pattern recognition to select incoming transmissions (e.g., packets) for calculation of RSSI values and to ensure that an RSSI value is determined for each ONU 325*a-n*. For example, each ONU will have a unique timing window for operation on the network, and when the number of unique RSSI levels for different timing windows are established and substantially constant, then this network characteristic, or ONU network pattern, is considered to be determined, and we can conclude that the RSSI values for each ONU in the network are known.

In a further embodiment, control of the sampling and/or RSSI calculation process by either the OLT system 450 or the optical transceiver 405 can be set, for example, by toggling a control signal or changing a configuration bit (e.g., in the memory 530 in MCU 420). In an even further embodiment, the OLT system 450 or host 445 may transmit an instruction to optical transceiver 405 and overwrite the frequency for obtaining RSSI data and/or the number of RSSI values to be stored in memory 530 and/or evaluated by optical transceiver 405 (e.g., when optical transceiver 405 internally handles obtaining, storing, and processing RSSI data).

In one embodiment, one or more lookup tables may be included in memory 530 and/or otherwise accessible by MCU 420. The lookup table(s) may contain values related to one or more predetermined parameter thresholds or limits. RSSI processor 520 and/or threshold comparator 515 may access all or a subset of RSSI values from RSSI processor 520 and/or memory 530 to compare the retrieved RSSI values with lookup table values to determine whether optical network 455 and/or optical transceiver 405 are operating outside predetermined parameter thresholds or limits. For example, the threshold comparator 515 of MCU 420 may compare RSSI values and/or the results of calculations based on RSSI values (e.g., from RSSI processor 520) to a lookup table in memory 530 to determine whether receiver 410 of optical transceiver 405 is operating outside of its dynamic range. The values in the lookup table(s) pertaining to predetermined parameter thresholds or limits may be derived in any way, such as through empirical testing and/or calibration. In a further embodiment, the values of the lookup table(s) may be transmitted and/or overwritten by the OLT system 450 or host 445.

MCU 420 may access the stored RSSI values for the same ONU or across all ONUs in the network, and calculate and/or determine an average, sum, dynamic range, or other result of a mathematical calculation (e.g., minimum/maximum determinations and/or threshold excursions). For example, optical transceiver 405 may evaluate multiple RSSI values and store the results in memory 530. In one embodiment of the present invention, optical transceiver 405 may determine and evaluate a running average of RSSI values, determined over a period of time, to determine whether the network values are changing within predetermined parameter thresholds or limits. In a further embodiment, MCU 420 may evaluate RSSI values with respect to the dynamic range of the receiver 410 of optical transceiver 405. In a further embodiment, MCU 420 may include histogram generator 525 to further evaluate whether optical transceiver 405 and/or optical network 455 (and/or a component thereof) is operating outside one or more predetermined parameter thresholds or limits. Histogram generator 525 may request and/or receive from memory 530 all or a subset of (e.g., a random sampling of) RSSI values for generating a histogram of RSSI values.

In a further embodiment, if optical transceiver 405 and/or one or more components in optical network 455 are operating outside one or more predetermined parameter thresholds or limits, MCU 420 may send a flag or interrupt signal to OLT system 450 or host 445 via interface 425. Such flags may be stored in memory 530.

Exemplary Optical Network Unit for a One-To-Many Optical Network

Figure 6:
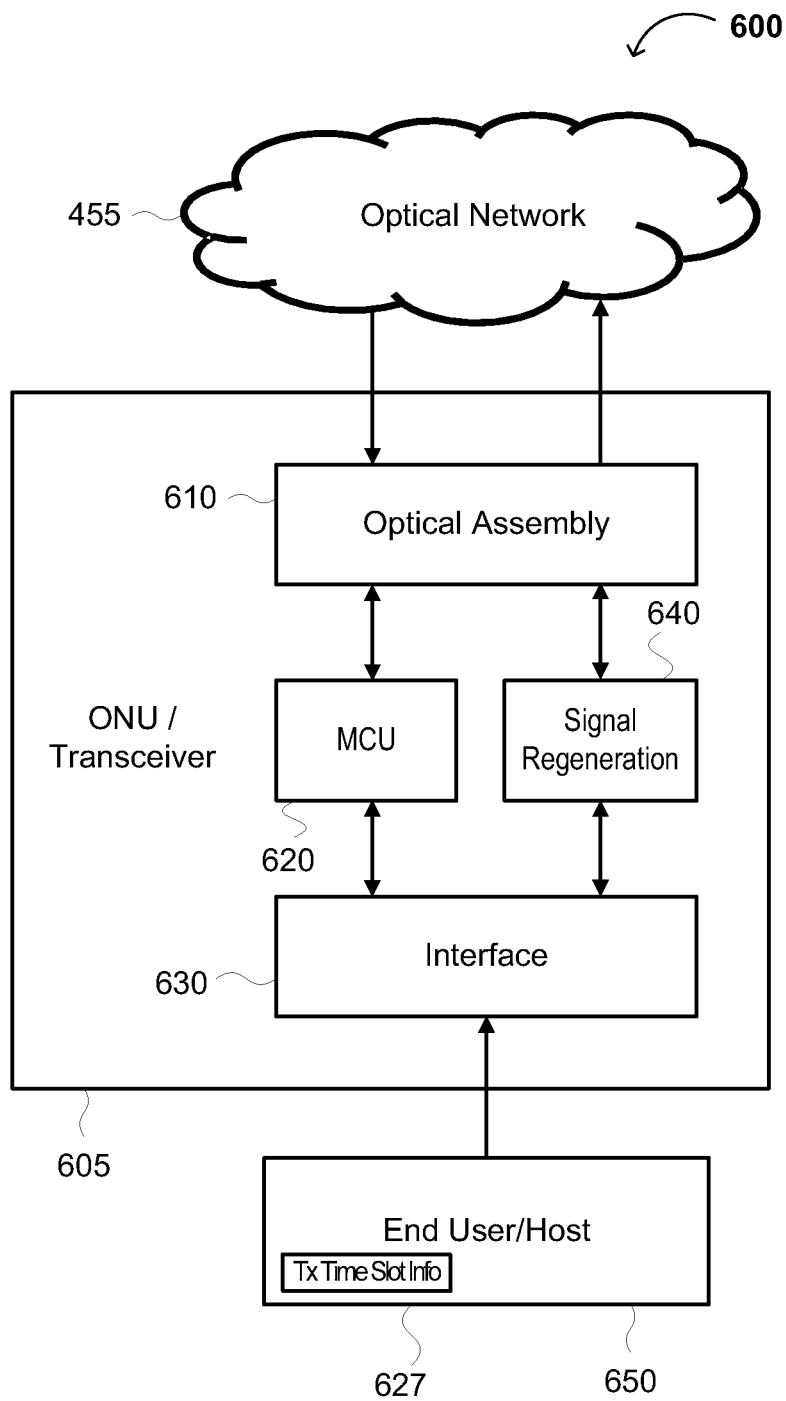
FIG. 6 is a diagram showing an exemplary ONU according to embodiments of the present invention.

FIG. 6 shows an exemplary ONU 605. ONU 605 comprises optical assembly 610, MCU 620, interface 630, and signal regeneration block 640. ONU 605 may communicate with other components of optical network 735 (such as optical transceiver 405) via optical assembly 610. Optical assembly 610 may comprise components for both optical data receiving and transmitting functions, such as a photodiode and one or more amplifiers in the optical data receiving pathway, and a laser diode and one or more signal drivers and/or modulators in the optical data transmitting pathway. ONU 605 may also communicate with an end user 650 through interface 630. Host 650, which may include or be exemplified by a media access control (MAC) device, sends packets or other blocks of information/data to ONU 605, and ONU 605 sends information from the OLT in the network to host 650.

Time slot information 627 may be sent from end user/host 650 to ONU 605 and accessed by MCU 620 to determine when ONU 605 may transmit data via optical assembly 610 to other components of optical network 455, such as optical transceiver 405. For example, transmission time slot information 627 may configure a counter or timer in MCU 620 to enable transmission of data from optical assembly 610 during an authorized time slot in the network protocol. In a further embodiment, ONU 605 may include components, circuitry, and or diagnostics to determine RSSI values (e.g., for signals coming from other terminals, such as OLT 405), the temperature of ONU 605 and/or one or more components thereof (e.g., a laser diode in optical assembly 610), and store, transform or evaluate other data to be transmitted via optical assembly 610 to optical transceiver 405 (e.g., for further transformation, transmission, etc. by the optical transceiver 405 of FIG. 4 and/or MCU 420 of FIG. 5).

Any parameter related to the operation(s) of optical transceiver 405 and/or optical network 455 may be evaluated to determine whether the optical transceiver 405 and/or optical network 455 is operating within one or more predetermined parameter thresholds or limits. Examples of parameters for which data may be obtained, sampled, processed, and/or analyzed may include temperature, voltage, optical or laser bias current, transmitted laser optical power, received optical power, and laser wavelength(s). For example, temperatures of multiple structures in optical transceiver 405 and/or ONU 325a-n, such as the temperature of the transmitting laser, the optical transmitter, and/or the optical receiver (e.g., a photodiode) can be evaluated by optical transceiver 405 to determine whether the optical transceiver is operating within one or more predetermined parameter thresholds or limits.

Figure 2:
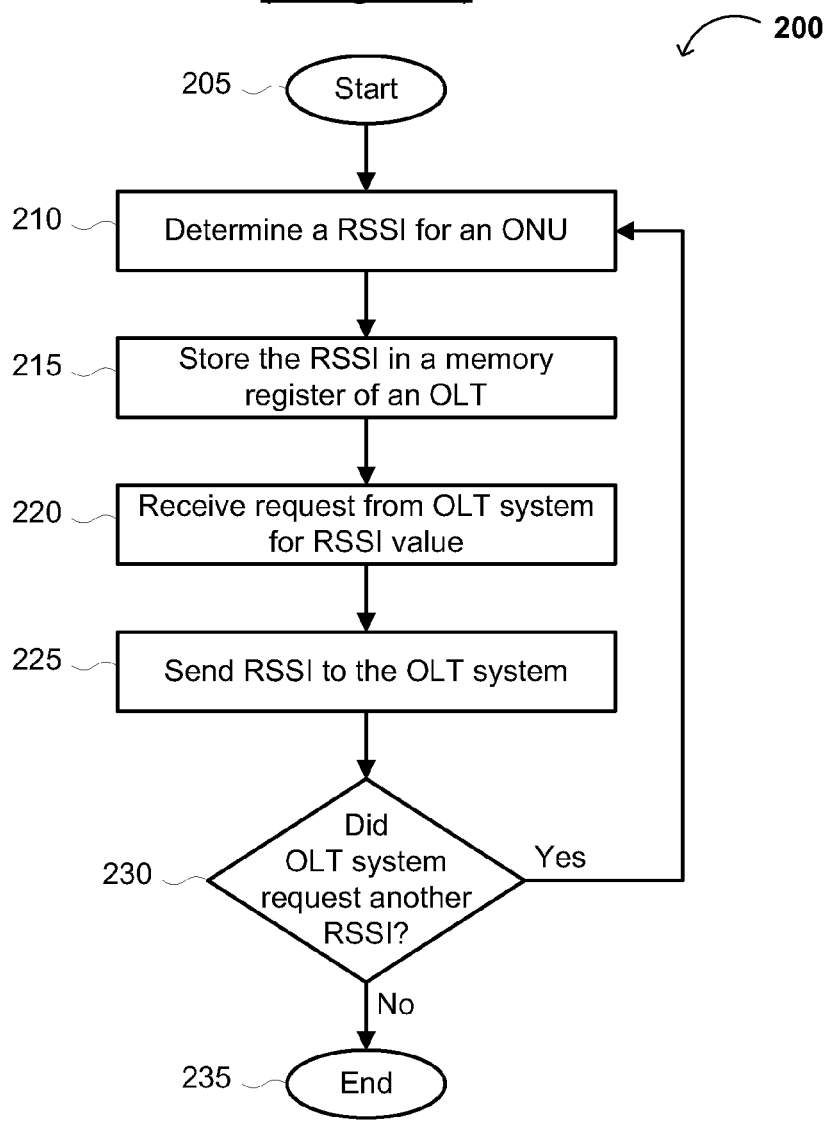
FIG. 2 is a flow chart showing a background method for receiving and/or processing a received signal strength indication (RSSI) value for a signal from an ONU.

Embodiments of the present invention allow for optical transceiver 405 to evaluate the operation of optical transceiver 405 and/or an optical network concerning predetermined parameter thresholds or limits without relying on signals or data requests from OLT system 450 or host 445. However, this does not preclude further embodiments wherein OLT system 450 or host 445 may request all or a subset of the RSSI values and/or data from optical transceiver 405. Further, OLT system 450 or host 445 may request, and OLT 705 may provide, an RSSI value for a particular ONU 325a-n using a process such as the one indicated in the flow of FIG. 2.

Exemplary Method(s) of Evaluating Signal Strength in an Optical Transceiver

In another embodiment, the invention relates to a method for monitoring an optical transceiver that generally comprises receiving one or more optical signals from each of a plurality of external transmitters, calculating a signal strength value for one or more optical signals, storing the signal strength values for each of the one or more optical signals, and accessing and/or evaluating at least a subset of the signal strength values.

Figure 7:
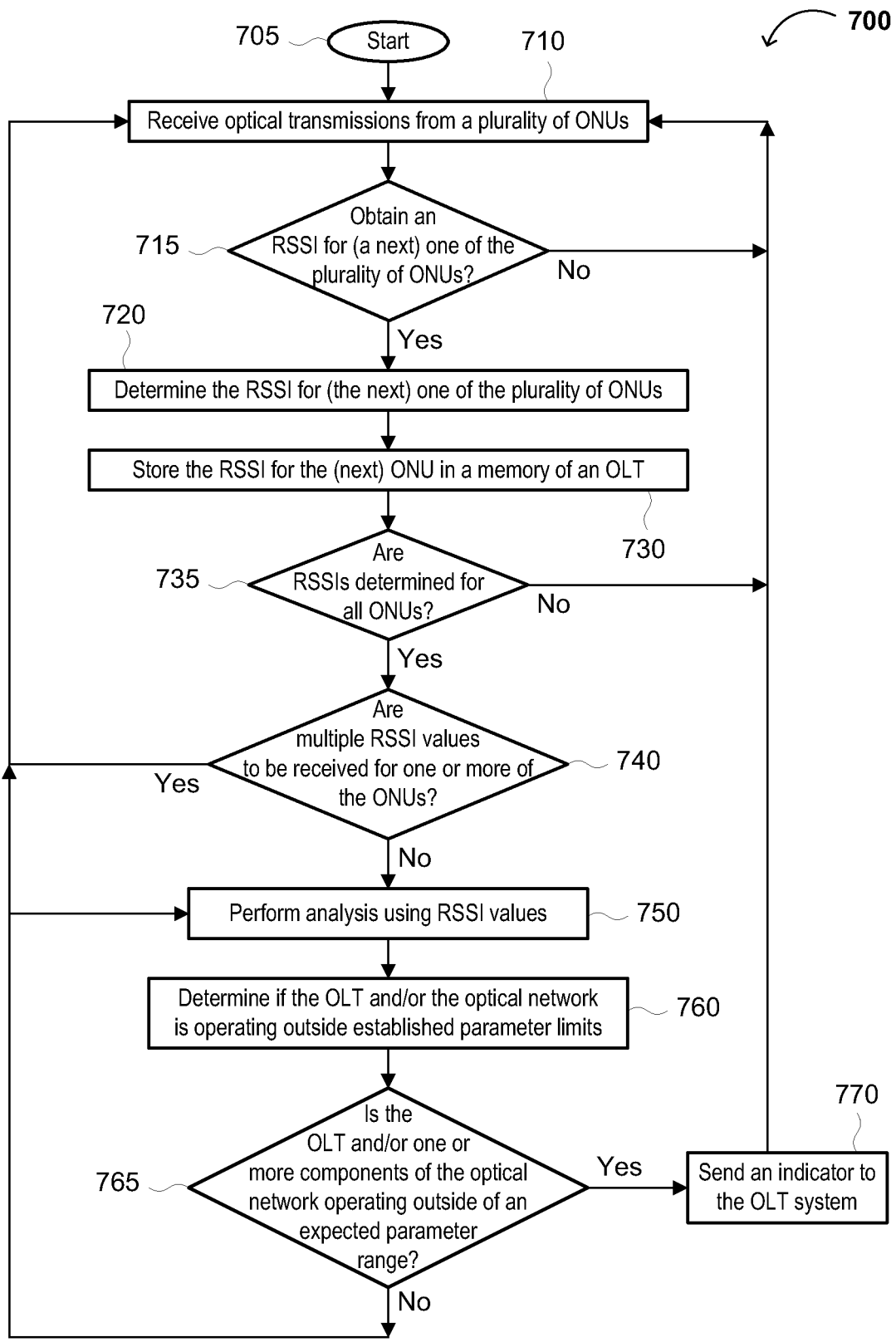
FIG. 7 is a flow chart showing an exemplary method for evaluating signal strength according to embodiments of the present invention.

As shown in FIG. 7, flow chart 700 illustrates an exemplary method of evaluating signal strength of a plurality of transmitters in an optical transceiver according to the present invention. The method typically involves continuous processing through various loops in the flow, although it also encompasses a single pass through part or all of the flow. For example, in the method, upon stable application of power, an OLT continuously receives optical transmission from ONUs in the network, and continuously processes RSSI information until the OLT or network is powered down.

Thus, the method may begin at 705, and at 710, an optical transceiver (e.g., the OLT) receives an optical transmission from one of a plurality of ONUs in the network. At 715, the optical transceiver (or, e.g., a host in the OLT system controlling the optical transceiver) determines whether to determine or obtain an RSSI for the received optical transmission. In one example, at 715, the optical transceiver may obtain a random RSSI for the received optical transmission, as described herein. If an RSSI value is not to be obtained, the method continues to receive transmissions from various ONUs in the network at 710.

When the decision is made or action is taken to obtain an RSSI for a given ONU in the network, the RSSI is determined at 720 (e.g., by signal detection and sampling, as described herein). For example, referring to FIGS. 4 and 5, based on data or information received from optical assembly 415 and data retrieved from memory 530, MCU 420 may receive and process the data or information utilizing RSSI calculator 430 and/or RSSI processor 520 to determine an RSSI value. Examples of other ways to determine RSSI at 720 may include obtaining the RSSI value or equivalent parameter value (e.g., signal strength or amplitude) from an ADC, control logic 510 and/or a component (e.g., an avalanche photodiode) in optical assembly 415, and in the case of an equivalent value, converting it to an RSSI value. A further example to determine RSSI at 720 may include using trigger circuit 460 to sample the received signal in response to a "valid data" signal from the signal detector 470, or a signal from the OLT system 450 or host 445, to obtain an RSSI value. At 730, the optical transceiver stores the RSSI in a memory (e.g., a register). For example, the RSSI may be stored in an on-board memory 530 in MCU 420 in the embodiment of FIG. 5.

At 735, the method determines whether an RSSI has been calculated or received for all ONUs in the network. For example, if the RSSI's are determined for the ONUs in a particular or predetermined order or sequence, a counter or other logic in the MCU 420 or control logic 510 (FIGS. 4 and 5) can count the number of authenticated time slots corresponding to each ONU 325a-n in the network transmitting information once to optical transceiver 405, then transmit a control signal or flag to indicate that an RSSI has been calculated or received for all of the ONUs 325a-n. Alternatively, random sampling and pattern analysis can be used to determine whether an RSSI has been obtained and calculated for each ONU. For example, each ONU has a unique transmission timing window (e.g., in the network setup, each ONU has a different or unique window of allowed operation). As a result, an RSSI can thus be calculated for each ONU until a pattern is established among the number of unique received signal levels as a function of different timing windows, as determined internally by the OLT transceiver. This allows for identification of the number of ONU's in the network and their corresponding signal strengths. If an RSSI has not been calculated or received for all ONUs, the method continues to receive optical transmissions at 710 and continues to obtain, determine and store RSSI values for a next one of the plurality of ONUs.

At 740, the method determines whether multiple RSSI values are to be determined and stored for one or more of the ONUs (e.g., either all of the plurality of ONUs in the network, or a subset thereof). If so, then the method returns to 710 and continues receiving, optical transmissions and obtaining, determining and storing an RSSI value for the next one of the ONUs. Successive cycles of this loop result in multiple RSSI's for a plurality of the ONUs in the network. The number of RSSI values to be calculated and/or the number and identity(ies) of the particular ONUs for which multiple RSSI values are to be calculated can be any number or suitable combination thereof. For example, the control logic 510 of optical transceiver 405 may be configured to determine RSSI values, store RSSI values, and determine whether one or more RSSI values for each of the plurality of ONUs 325*a-n* have been calculated and/or received. As a further example, the optical transceiver 405 may utilize pattern recognition at 710-735 to obtain and/or determine RSSI values and to determine whether an RSSI has been calculated or received for all ONUs. As a further example, the optical transceiver 405 may utilize randomized and/or equally-weighted signal strength values for the plurality of remote optical transmitters in the optical network which are the result of obtaining random RSSIs and assigning them equal weight (e.g., by obtaining the same number for each ONU).

At 750, the optical transceiver performs an analysis of the stored RSSI values, and at 760, the optical transceiver determines whether the optical transceiver, the optical network and/or one or more of the components of the optical network are operating outside of one or more established parameter thresholds or limits or has changed over time. In a further embodiment, the optical transceiver may determine whether the receiver of the optical transceiver is operating outside of established parameter thresholds or limits. Examples of receiver parameters evaluated by the optical transceiver may include dynamic range, running average signal strength, received optical power, and data usage rate.

For example, referring to FIG. 4, MCU 420 may utilize threshold comparator 515, RSSI processor 520, histogram generator 525 and/or RSSI data in memory 530 to evaluate the RSSI values and determine whether optical receiver 410 of optical transceiver 405 is operating outside predetermined parameter thresholds or limits. The control logic 510 or arithmetic logic circuit (not shown) of MCU 420 may analyze all or a subset of the stored RSSI values to determine whether optical transceiver 405 is operating outside predetermined parameter thresholds or limits. Optical transceiver 405 may also determine and evaluate a running average of RSSI values, to determine whether optical transceiver 405 (and in particular optical receiver 410) is operating within its predetermined dynamic range. In a further example, the control logic 510 of MCU 420 may utilize one or more lookup tables containing values related to predetermined parameter thresholds or limits for the analysis of RSSI values at 750 of the flow diagram 700.

At 765, if the optical transceiver determines that optical transceiver 405 is operating outside of a predetermined parameter or limit, the optical transceiver can send an indicator to the OLT system or host at 770. Otherwise, the method continues to receive optical transmissions at 710 and flow through various cycles to obtain, determine, store and analyze one or more RSSI values for a plurality of ONUs in the network. In one embodiment, the indicator sent to the OLT system or host at 770 may be a flag or interrupt signal. In further embodiments, the RSSI values can be displayed as a histogram on a display interface.

Exemplary Method of Evaluating Signal Strength in an Optical Network

A further aspect of the invention relates to a method for monitoring an optical network that generally comprises transmitting an optical signal from each of a plurality of terminals in the optical network, receiving the optical signal from each of the plurality of terminals in a receiver, calculating a signal strength value for one or more signals received by the receiver, and processing at least some of the signal strength values.

Flow chart 700 of FIG. 7 also illustrates an exemplary method of evaluating signal strength in an optical network according to the present invention. As discussed above, the method may begin at 705 (e.g., by powering on the network or an optical transceiver therein) and continue through 740 obtaining and determining one or more RSSI values from a plurality of ONUs in the network. For example, ONU 605 (FIG. 6) may transmit an acknowledgment or data to optical transceiver 405 for evaluation and/or processing by optical transceiver 405. At 750, the optical transceiver performs an analysis of the stored RSSI values, and at 760, the optical transceiver determines whether the optical network is operating outside of one or more established parameter thresholds or limits or has changed over time. For example, optical transceiver 405 may determine whether one or more ONUs 325*a-n* are operating outside of predetermined parameter thresholds or limits based on an evaluation of RSSI values calculated by optical transceiver 405. For example, optical transceiver 405 may evaluate the RSSI values from ONU 325*a-n* and/or compare the values to (its own) data in memory 530 regarding acceptable transmission signal strength values, and determine whether a particular ONU was sending optical data at improper levels. In a further example, the data could be displayed as a histogram on a display interface.

At 765, the optical transceiver determines whether the optical network and/or one or more of its components are operating outside of a predetermined parameter or limit. If it is determined that the optical network is operating outside of predetermined parameter thresholds or limits, the optical transceiver can send an indicator to the OLT system or host at 770. For example, the indicator sent to the OLT system or host at 770 may be a flag or interrupt signal. The method ends, for example, by powering down the OLT, OLT system or network.

CONCLUSION/SUMMARY

Thus, the present invention provides an optical transceiver, optical network, and/or methods for evaluating an optical network and/or an optical transceiver. Embodiments of the present invention advantageously provide the optical transceiver and/or optical network with the capability of evaluating whether the optical transceiver is operating within certain specifications, evaluating whether components of an optical network are operating within certain specifications, and/or notifying a host or system when components are operating outside of certain operating limits. Embodiments of the present invention also include an optical transceiver capable of evaluating whether the receiver of the optical transceiver is operating within its dynamic range and notifying a host or system whether the receiver is operating outside of its dynamic range.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An optical transceiver, comprising:
    a) an optical receiver configured to receive optical information from each of a plurality of remote optical transmitters during an allotted or predetermined time period or time slot for each remote optical transmitter, in accordance with timing sequence information;
    b) circuitry configured to calculate signal strength values of the received optical information;
    c) logic configured to process the signal strength values for each of the plurality of remote optical transmitters, determine a minimum signal strength value and a maximum signal strength value, and determine from a random selection or random sampling of the signal strength values whether the optical transceiver is operating outside a dynamic range of the optical receiver, wherein the logic comprises a signal strength processor and a threshold comparator that compare at least a subset of the signal strength values with thresholds related to limits of the dynamic range, determine whether the optical transceiver is operating outside the limits of the dynamic range, and output an alarm or warning when the optical transceiver is operating outside one or more of the thresholds related to the limits of the dynamic range, and the dynamic range is a predetermined difference in signal strength values of sequentially received optical information from said plurality of remote optical transmitters that is less than a normal operating range for the optical receiver and in which the optical receiver processes the sequentially received optical information without data degradation; and
    d) one or more memories configured to store the signal strength values, the limits of the dynamic range, and alarm and warning thresholds related to the limits of the dynamic range.

2. The optical transceiver of claim 1, wherein the logic comprises a microcontroller or microprocessor.

3. The optical transceiver of claim 1, wherein the one or more memories comprise volatile memory.

4. The optical transceiver of claim 1, wherein the logic is further configured to notify (i) a system including the optical transceiver or (ii) a host coupled to the transceiver when the optical transceiver is operating outside the dynamic range.

5. The optical transceiver of claim 1, further comprising an interface configured to transmit at least some of the calculated or processed signal strength values to (i) a host coupled to the transceiver or (ii) a system including the optical transceiver.

6. The optical transceiver of claim 5, wherein the interface is further configured to transmit at least a portion of the optical information to the host or the system.

7. A method for monitoring one or more optical transceivers, the method comprising:
    establishing a timing sequence for the optical transceiver to receive one or more optical signals from each of a plurality of external transmitters;
    receiving said one or more optical signals from each of said plurality of external transmitters during an allotted or predetermined time period or time slot for each external transmitter indicated by the timing sequence;
    calculating a signal strength value for each of the one or more optical signals by randomly sampling the received optical signals to obtain an equally weighted distribution of signal strength values for the plurality of external transmitters;
    determining a minimum signal strength value and a maximum signal strength value among the optical signals from the plurality of external transmitters;
    storing said signal strength values for each of the one or more optical signals, thresholds related to limits of the dynamic range of the optical receiver, said minimum signal strength value, and said maximum signal strength value;
    determining from a random selection or random sampling of the signal strength values and limits of the dynamic range whether the optical transceiver is operating outside the dynamic range by comparing the stored signal strength values with the thresholds related to the limits of the dynamic range, wherein the dynamic range is a predetermined difference in signal strength values of sequentially received optical signals from said plurality of remote optical transmitters that is less than a normal operating range for the optical receiver and in which the optical receiver processes the sequentially received optical information without data degradation; and
    notifying (i) a host coupled to the optical transceiver or (ii) a system including the optical transceiver when the optical transceiver is operating outside the dynamic range limits.

8. A method for monitoring an optical network, the method comprising:
    a) transmitting an optical signal from each of a plurality of terminals in the optical network;
    b) receiving said optical signal from each of said plurality of terminals in a receiver during an allotted or predetermined time period or time slot for each terminal in accordance with a timing sequence;
    c) calculating a signal strength value for each signal received by the receiver;
    d) determining a minimum signal strength value and a maximum signal strength value among the optical signals from the plurality of external transmitters;
    e) storing said signal strength values, thresholds related to limits of a dynamic range of the receiver, said minimum signal strength value, and said maximum signal strength value;
    f) determining from a random selection or random sampling of the signal strength values and limits of the dynamic range of the receiver whether the receiver is operating outside the dynamic range by comparing the stored signal strength values with the thresholds related to the limits of the dynamic range, wherein the dynamic range is a predetermined difference in signal strength values of sequentially received optical signals from said plurality of terminals that is less than a normal operating range for the optical receiver and in which the receiver processes sequentially received optical signals without data degradation; and
    g) notifying (i) a host coupled to the receiver or (ii) a system including the receiver and the terminals when the receiver is operating outside the dynamic range limits.

9. The method of claim 8, further comprising transmitting at least some of the calculated signal strength values and/or processed signal strength values to a host coupled to the receiver or a system including the receiver.

10. The method of claim 8, further comprising establishing the timing sequence for receiving the optical signal(s) from each of the plurality of terminals from the host.

11. The method of claim 8, further comprising requesting at least a subset of said calculated or processed signal strength values by the host or the system.

12. The method of claim 8, further comprising displaying the calculated signal strength values as a histogram on a display interface.

13. The method of claim 8, further comprising, as a result of processing at least some of said signal strength values, reporting (i) one or more changes in the network and/or (ii) a difference between a current operating state and an earlier state of the network.

14. An optical network, comprising;
   a) optical transceiver of claim 1;
   b) a plurality of network transceivers in optical communication with the optical transceiver; and
   c) a host coupled to the optical transceiver or a system including the optical transceiver.

15. The optical network of claim 14, further comprising optical media communicatively connecting each of the plurality of network transceivers with the optical transceiver.

16. The optical transceiver of claim 1, wherein the allotted or predetermined time periods or time slots are determined by time-division multiplexing.

\* \* \* \* \*